United States Patent [19]
Damm et al.

[11] 3,776,380
[45] Dec. 4, 1973

[54] APPARATUS AND METHOD FOR MONITORING THE STATUS OF A RADIO FREQUENCY THICKNESS GAUGE

[75] Inventors: David A. Damm, Toledo; Robert G. McKim, Maumee, both of Ohio

[73] Assignee: Owens-Illinois, Inc., Toledo, Ohio

[22] Filed: Jan. 24, 1973

[21] Appl. No.: 326,245

[52] U.S. Cl. ......................... 209/111.5, 324/58.5 A
[51] Int. Cl. ............................................. B07c 5/34
[58] Field of Search ........................ 209/111.5, 73; 324/58.5 R, 58.5 A

[56] References Cited
UNITED STATES PATENTS

| | | | |
|---|---|---|---|
| 3,379,306 | 4/1968 | Mathias et al. | 209/111.5 |
| 3,393,799 | 7/1968 | Schmersal | 209/111.5 X |
| 3,708,064 | 1/1973 | Schepler et al. | 209/111.5 X |
| 3,710,930 | 1/1973 | Scherf | 209/111.5 |

*Primary Examiner*—Allen N. Knowles
*Attorney*—Steve M. McLary et al.

[57] ABSTRACT

Apparatus and method for monitoring the status of a radio frequency glass thickness gauge. One type of thickness measuring device for glass containers uses the attenuation radio frequency signal as a measure of thickness. In order to compensate for ambient conditions, a compensated reference voltage, which represents the radio frequency signal with no glass present, is generated between gauging cycles. The present invention ensures that the compensated reference voltage is within its operational limits. If the compensated reference voltage is above a pre-selected maximum value or below a pre-selected minimum value, a signal is generated to turn on a warning light to indicate the deviation. In addition, the same signal may be used to interrupt the rejection of glass containers, since compensated reference voltages outside the tolerance limit will usually cause false rejection of good containers. The rate at which the compensated reference voltage is changed is likewise determined, and a signal is generated when the rate of change exceeds a pre-selected value. This signal turns on a warning light which indicates system oscillation type failure. The same oscillation warning signal may also be used to interrupt the rejection of glass containers, again to prevent false rejection of good containers.

36 Claims, 2 Drawing Figures

PATENTED DEC 4 1973    3,776,380

APPARATUS AND METHOD FOR MONITORING THE STATUS OF A RADIO FREQUENCY THICKNESS GAUGE

BACKGROUND OF THE INVENTION

This invention generally relates to the inspection of glass containers. More specifically, this invention relates to the measurement of the thickness of the sidewall of glass containers using radio frequency energy. Most particularly, this invention relates to an out-of-tolerance warning and shut-down system for a radio frequency thickness gauge.

One type of radio frequency glass thickness gauge is disclosed in U.S. Pat. No. 3,708,064. In that gauge, a compensated reference voltage is generated as a measure of the radio frequency signal when no glass is present. The present invention is an improvement in the gauge disclosed in U.S. Pat. No. 3,708,064. The improvement resides in monitoring the compensated reference voltage, and generating output signal if the compensated reference voltage rises above a pre-selected maximum value, falls below a pre-selected minimum value, or exceeds a preselected maximum rate of change. The generated signal will light a warning light and, if desired, preventing any further glass containers from being rejected until the system fault is corrected.

SUMMARY OF THE INVENTION

This invention is an improvement in an apparatus of the type which sorts articles made of a dielectric material according to their thickness by measuring the voltage attenuation of a radio frequency field passing the article thickness signal is generated by subtracting a compensated reference signal, which is a measure of the signal with no article present, from the signal received when an article is present. The improvement comprises: (a) a first voltage comparison means for generating an output signal when the compensated reference voltage rises above a maximum pre-selected level; (b) a first out-of-tolerance alarm means for signaling the rise of the compensated reference voltage above the maximum pre-selected level in response to an output signal from the first voltage comparison means; (c) a second voltage comparison means for generating an output signal when the compensated reference voltage falls below a minimum pre-selected level; and (d) a second out-of-tolerance alarm means for signaling the fall of the compensated reference voltage below the minimum preselected value in response to an output signal from the second voltage comparison means.

DETAILED DESCRIPTION OF THE DRAWINGS

This invention is an improvement in an apparatus for inspecting dielectric members, such as that shown in U.S. Pat. No. 3,708,064, the teachings of which are hereby incorporated by reference. For convenience in reference, the cited patent will hereinafter be referred to as the Schepler patent. The Schepler patent teaches a device which is useful for measuring the thickness of dielectric members, particularly glass containers. One of the characteristics of the Schepler device is that it is an active type inspection apparatus. That is, in the event of any type of system imbalance or failure, the general result is that the apparatus will reject all objects inspected by it, whether or not they are truly defective. The circuits of the present invention are designed to overcome this operational difficulty in a manner which will be hereinafter explained. The elements of the Schepler patent are shown in block diagram form in FIG. 1, and reference should be had to the Schepler patent for the exact details of the configuration of these elements.

Figure 1:
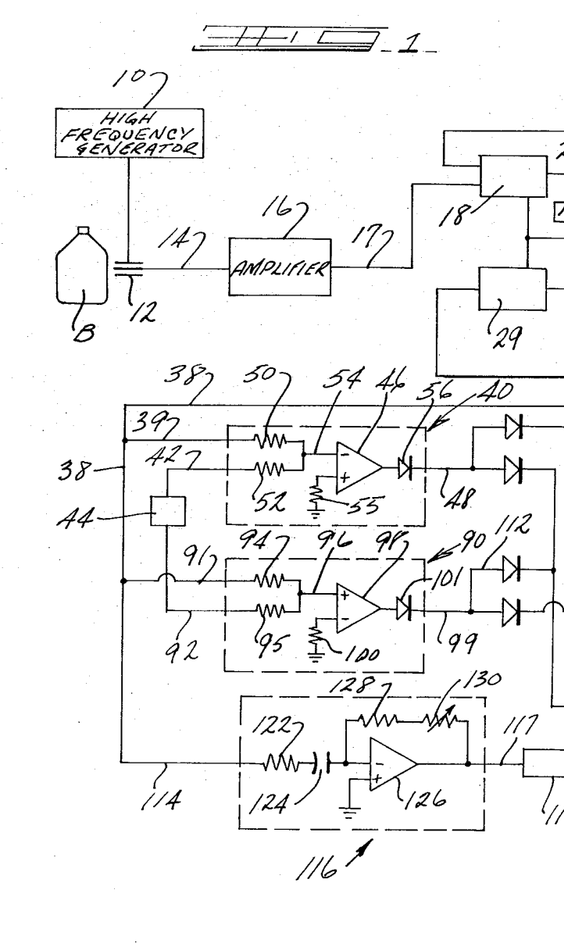
FIG. 1 is a schematic representation of one embodiment of the present invention.

Referring now to FIG. 1, a high frequency signal is provided by a generator 10, connected to a conductive sleeve 12, which forms a radio frequency antenna. The high frequency signal may be in the order of 13,560,000 cycles per second to establish a radio frequency field which extends outwardly from the front face of the antenna 12 into the region of the sidewall of a container B being gauged. This field will have a particular strength and shape, depending upon the dielectric of the material positioned in front of the antenna 12. When a container B is moved into the inspection station, the field will be distorted to a certain extent, the field strength will be changed, and the amplitude and phase of the high frequency signal induced in a probe 14 will be changed depending upon the thickness of the dielectric material in front of the antenna 12. Thus, the magnitude of the voltage induced in the probe 14, which is positioned coaxially within the antenna 12 varies substantially with the variations in the thickness of the glass being gauged.

It should be understood at this point that the circuit shown in FIG. 1 is a circuit for a single channel of inspection. That is, the circuit shown in FIG. 1 will inspect substantially one vertical region of a container B around the circumference of the container B as the container B is rotated. However, the circuit of FIG. 1 may be duplicated several times if it is desired to obtain measurements at a number of vertical locations throughout the height of the particular container B. In addition, as is conventional practice, the power supplies to the active elements within the circuit shown in FIG. 1 have been omitted for the sake of clarity. Those skilled in the art will readily recognize the necessity for such power supplies and their connections to such elements as require a power supply.

An amplifier 16 is connected to receive the output from the probe 14 and provides a direct current voltage output that is related by amplitude to the amplitude of the high frequency input received from the probe 14. The output of the amplifier 16 is connected to the input of a summer circuit 18 by suitable electrical wiring 17. The summer circuit 18 is connected to the input of an integrating circuit 20 through a switch 22. As explained in the Schepler patent, the switch 22 is closed only during periods when the thickness of a container B is not being gauged, and the combination of the summer circuit and the integrating circuit 20 allows the generation of a reference voltage which indicates a glass thickness of zero. This reference voltage includes all the changes that may have occurred in the external machine-mounted components in the system or in the ambient effects that may change the level of voltages produced by the system, the ambient temperature, relative humidity, the accumulation of dirt on the antenna 12 or the probes 14, or changes in the configuration of probes themselves. When the system then processes a signal received when glass is present in front of the probe 14, the automatically compensated reference voltage may be used as a reference to be compared with the input voltage to enable the summer circuit 18 to provide a thickness voltage which is a true measure of the thickness of the glass in front of the probe 14. In addition, the automatically compensated reference voltage is also utilized to provide or establish an automatically compensated reject reference voltage. The reference voltage appears as outputs from the integrating circuit 20 on electrical lines 23 and 24. A potentiometer 26, having a movable tap 25 is connected to the integrating circuit 20 through the electrical wiring 24. Movement of the tap 25 enables selection of a reject level which corresponds to a minimum glass thickness which is acceptable, for example, forty thousandths of an inch. Since the voltage supplied to the potentiometer 26 is automatically compensated, the reject reference voltage derived from the tap 25 will also be automatically compensated. Finally, two comparator circuits 28 and 29 act as a means for comparing the output of the summer circuit 18 with the reject reference signal to provide a reject signal when the thickness of the article is below a minimum acceptable thickness set by the magnitude of the reject reference signal. This function is fully explained in the Schepler patent. If a defective container B is detected, an output from the second comparator circuit 29 appears on electrical output line 30. In the present invention, this output signal is not directly connected to a reject control mechanism 32, as is the case in the Schepler patent, but rather, the output wiring 30 is connected to a relay 34, which in turn has a connection 36 to the reject control 32.

The compensated reference voltage, hereinafter referred to as "voltage C" can be seen as a very important voltage for the entire system. It is this voltage which provides the zero reference level that allows making an accurate determination of the actual thickness of the container B being measured. If this voltage varies outside its normal operational limits as a result of system malfunctions of one type or another, false rejection will result. Thus, the present circuit is designed to monitor the value of the voltage C and generate an alarm if it extends beyond its operational limits.

The normal operational value of the voltage C is −7 volts. The characteristics of the entire system are such that reasonably accurate results will be obtained if the voltage C rises as high as −8 volts or falls as low as −6 volts. Beyond either −6 or −8 volts, the system is operating unstably and will not accurately measure the thickness of a container B. Thus, the first check which is made of the voltage C is one which determines whether or not the voltage C is above −8 volts or below −6 volts. It should be understood at this point that the specific voltage levels and voltage signs which are given are simply given by way of example of a specific operational embodiment. The actual levels are not of critical importance, as those skilled in the art will recognize, but what is of importance is their relative magnitudes. Thus, the recitation of specific voltage levels and signs previously and hereinafter should not be taken by way of limitation to these particular voltage levels or voltage signs.

The voltage C is transmitted through suitable electrical wiring 38 and 39 to a first voltage comparison means 40. A second input to the first voltage comparison means 40 is furnished through an electric wire 42 which is connected to a regulated voltage supply 44. The regulated voltage supply 44 may preferably furnish a constant voltage of +15 volts for the purposes of the exemplary voltages cited herein. The purpose of the first voltage comparison means 40 is to determine whether or not the voltage C is above −8 volts. If the voltage C is greater than −8 volts, the first voltage comparison means 40 will generate an appropriate output signal. One of the components making up the first voltage comprison means 40 is an operational amplifier 46. The operational amplifier 46 is used such that it has only two output states. The output of the operational amplifier 46, which appears on a wire 48 connected to its output terminal, is either +15 volts or −15volts. A first input resistor 50 is connected in series with the wire 39. A second input resistor 52 is connected in series with the wire 42. The resistors 50 and 52 act as a voltage dividing network, and furnish an input to the negative terminal of the operational amplifier 46 through a wire 54. The resistors 50 and 52 are relatively sized such that, so long as the voltage C furnished through the line 39 is below −8 volts, the input voltage transmitted by the wire 54 to the operational amplifier 46 will be positive. With a positive signal furnished to the negative terminal of the operational amplifier 46, the output of the operational amplifier 46 will be −15 volts. When the voltage C rises above −8 volts, for example −8.5 volts, the voltage output on the wire 54 will become negative. With a negative input to the negative terminal of the operational amplifier 46, the output of the operational amplifier 46 will switch to +15 volts. This transition actually occurs whenever the voltage transmitted by the wire 54 reaches a value of zero. A final input to the operational amplifier 46 is a grounded resistor 55 which is connected to the positive input terminal of the operational amplifier 46. This is conventional practice in the wiring of operational amplifiers, and the value of the resistor 55 is substantially equal to the effective input impedance of the two parallel resistors 50 and 52. A diode 56 is connected in series in the output wire 48 from the operational amplifier 46. The diode 56 is back-biased such that, when the output from the operational amplifier 46 is −15 volts, this voltage cannot flow through the diode 56 and will cause no further action within the rest of the circuit. However, in the situation where the voltage C has risen above −8 volts, the +15 volts output from the operational amplifier 46 will be able to flow through the diode 56 to one of two paths provided. An electrical wire 58 connects the wire 48 to a first out-of-tolerance alarm means 60. The purpose of the out-of-tolerance alarm means 60 is to respond to a signal generated by the operational amplifier 48 indicating that the value of the voltage C has risen above −8 volts and inform an operator of the gauging machine that this has occurred. Within the first out-of-tolerance alarm means 60, the wire 58 is connected to the gate terminal of a silicon controlled rectifier (SCR) 62. The cathode of the SCR 62 is grounded. The anode of the SCR 62 is connected to a warning light 64 through a suitable electrical wire 65. The SCR 62 and the warning light 64 are connected in series to a reset switch 66 by suitable electrical wiring 68 and 70. The reset switch 66 serves a function which will be described later. The reset switch 66 is connected in series to a voltage source 71. The net result of this particular wiring configuration is that the SCR 62 is normally in the nonconducting state. Thus, no current may flow from the voltage source 71 through the warning light 64, therefore, keeping the warning light 64 off. When the voltage C rises above the −8 volt level, the +15 volt output from the operational amplifier 46 through the gate of the SCR 62 turns on the SCR 62. A resistor 72 and a capacitor 73 are connected in parallel between the gate of the SCR 62 and the grounded cathode of the SCR 62 as is conventional practice in such circuits.

A second output wire 74 connected to the wire 48 carries the +15 volt signal which occurs when the voltage C has risen above −8 volts to a control means 75 for disabling the reject control system 32. The relay 34, previously mentioned, is a part of the control means 75. The relay 34 has within it a conventional operating coil 76. The operating coil 76 is connected in series through an input wire 78, the wire 70, and the reset switch 66 to the voltage source 71 and through an output wire 79 to the anode of an SCR 80. The cathode of the SCR 80 is grounded. The relay 34 is of the normal closed type well known in the art in which a contact pair 81 and 82 are closed so long as the coil 76 is de-energized or has no voltage flowing through it. It will be noted that the output line 30 is connected to the contact 81 and the line 36, connected to the reject control mechanism 32, is connected to the contact 82. So long as the coil 76 is deenergized, a reject signal generated by the apparatus of the Schepler invention will be transmitted through the line 30 between the contact pair 81 and 82 and through the line 36 to the reject control mechanism 32 to reject any object which shows a defective condition. However, should the coil 76 be energized, the contact 81 will be opened by the conventional operating function of the relay 34. Thus, returning to the first voltage comparison means 40, when an output signal appears on the line 74, the SCR 80 will be placed into the conducting state. With the SCR 80 in the conducting state, current may flow through the coil 76, thus causing the contact pairs 81 and 82 to no longer be in contact. This then will prevent any signal from reaching the reject control mechanism 32. Since the total inspection apparatus may often be unattended or in an area where it is not readily accessible, the mere lighting of the warning light 64 may not be sufficient to prevent rejection of some good bottles B before the system fault which caused the out-of-tolerance voltage can be corrected. Thus, it is desirable that the entire reject system 32 be disabled when the voltage C varies beyond its normal operational range. Therefore, when the +15 volt signal is propagated along the output wire 48, indicating a rise of the voltage C above −8 volts, the signal will be carried along the wire 74 to the gate of the SCR 80, thereby turning the SCR 80 on and operating the relay 34 to interrupt the propagation of the reject signals to the reject control mechanism 32. The SCR 80 is provided with a resistor 84 and a capacitor 85 in parallel between the gate of the SCR 80 and the grounded cathode of the SCR 80, as is conventional practice in such circuits. In some cases, it may be desirable for the relay 34 to have additional contact pairs which can operate a siren, bell or other attention-getting device to ensure prompt attention in case of a gauge failure of the type herein described.

The reset switch 66 is provided to allow the resetting of the entire system once a fault which causes out-of-limits voltages is corrected. That is, the SCRs 80 and 62 will continue in their conducting state until the voltage to them is interrupted. Therefore, once the fault has been corrected, the normally closed reset switch 66 is pressed, which momentarily interrupts the flow of current from the voltage source 71. This allows the SCRs 80 and 62 to assume their nonconductive states. This turns out the warning light 64 and allows the contact pair 81 and 82 to be reconnected again, thereby resetting the system in a state ready to accept another reading of an out-of-tolerance voltage C.

It is also necessary to check the voltage C to ensure that it does not reach a value below −6 volts. To this end, a second voltage comparison means 90 is provided. A wire 91 connects the second voltage comparison means 90 to the wire 38 which carries the voltage C. A wire 92 connects the second voltage comparison means 90 to the regulated voltage supply 44. As was the case with the first voltage comparison means 40, a resistor type voltage dividing bridge is used in the second voltage comparison means 90. A resistor 94 is connected in series in the wire 91. A resistor 95 is connected in series in the wire 92. The summed output of the voltages across the resistors 94 and 95 is transmitted through a wire 96 into the positive input terminal of an operational amplifier 98. The resistors 94 and 95 are so sized that, so long as the voltage C is above −6 volts, the output carried by the wire 96 into the positive terminal of the operational amplifier 98 will be negative in sign. When the voltage C falls below −6 volts, the output in the wire 96 will be positive in sign. The operational amplifier 98 in common with the operational amplifier 46 has only two possible outputs: −15 volts or +15 volts. So long as a negative input is placed into the positive input terminal of the operational amplifier 98, the output of the operational amplifier 98, as transmitted through an output wire 99, will be − 15 volts. However, when the input to the positive terminal of the operational amplifier 98 is positive or zero, the output carried by the wire 99 will be +15 volts. A resistor 100 is connected between ground and the negative input terminal of the operational amplifier 98. The resistor 100 is so sized as to match the effective input resistance of the parallel resistors 94 and 95. So long as the output carried by the wire 99 is negative in sign, the output will be blocked by a back-biased diode 101. As was the case with the first voltage comparison means 40, there are two possible paths for the output of the second voltage comparison means to follow. The output wire 99 is connected to a wire 102, which is connected to a second out-of-tolerance alarm means 104. The wire 102 is connected to the gate of an SCR 106. The SCR 106 is normally held in the nonconducting state. When the +15 volt signal is transmitted by the wire 102 to the SCR 106, the SCR 106 assumes the conducting state. The cathode of the SCR 106 is grounded. The anode of the SCR 106 is connected in series with a warning light 108 through a wire 107. The warning light 108 in turn is connected in series to the wire 68. As previously explained, the wire 68 is connected to the voltage supply 71. Thus, whenever the SCR 106 assumes the conducting state, the warning light 108 will be turned on. It is necessary to separate the two out-of-tolerance alarm means 60 and 104 to aid in tracing the defect in the entire system. By lighting a separate light for a voltage above −8 volts or below −6 volts, troubleshooting is greatly simplified. Again, as is conventional, a resistor 109 and a capacitor 110 are provided in parallel in the gate circuit of the SCR 106. A second wire 112 connected to the output wire 99 is connected to the wire 74. As previously explained, the wire 74 acts to furnish a signal to the control means 75 to shut down the transmission of a reject signal to the reject control mechanism 32. It is not necessary to provide a separate control means 75 for the second voltage comparison means 90 as it was necessary to provide a second out-of-tolerance alarm means 104 since the shutdown of the system should occur whenever the voltage C rises above −8 or falls below −6. The functioning of the control means 75 has been fully explained previously, and the functioning is identical in the situation where the signal is furnished through the wire 112 to the wire 74 as when the wire 74 itself carries the primary signal.

A second and distinct type of system failure which may occur is one in which the voltage C relatively rapidly oscillates between values. In this case, the absolute value of the voltage C may lie within the range of −6 to −8 volts, but the value within the range changes rapidly. Normally, the voltage C is relatively stable from cycle to cycle and exhibits only a small amount of change each time the comparison is made and the voltage C adjusted. However, some modes of system failure result in the voltage C varying widely and being compensated by a relatively large amount between each gauging cycle. In this case, it is also desirable to shut down the system to prevent rejection of good bottles B. A wire 114 connects the wire 38, carrying the voltage C, to a circuit means 116 for generating the first derivative with respect to time of the voltage C. The output of the circuit means 116 is transmitted through a wire 117 to a full wave rectifier 118 of conventional design. The output of the full wave rectifier 118 is connected to a rate-of-change gate means 120 by a wire 121. The purpose of the rate-of-change gate means 120 is to generate a signal when the rate of change of the voltage C goes above a pre-selected value. Returning to the circuit means 116, it may be seen that the means for generating the first derivative with respect to time of the voltage C is an operational amplifier type circuit. In this circuit, an input resistor 122 and capacitor 124 are connected in series to one of the input terminals of an operational amplifier 126. A feedback resistor 128 connected between the input and output of the operational amplifier 126 completes the differentiating circuit. A variable resistor 130 is connected in series with the feedback resistor 128. The variable resistor 130 allows adjustment of the maximum allowable rate of change of voltage and thus acts as a fine-tuning control for the entire circuit. However, it should be realized that the variable resistor 130 is not an absolute necessity. If the operational parameters of the entire apparatus are well known and established, a simple fixed feedback resistor such as 128 would be sufficient to complete the circuit. The output of the operational amplifier 126 is of course connected to the wire 117 as previously noted. The output in terms of voltage along the wire 117 into the full wave rectifier 118 is a voltage which indicates the rate at which the voltage C is changing. The full wave rectifier 118 compensates for the negative and positive going portions of the voltage C and gives an output along the wire 121 which is a positive going voltage at all times. The rate-of-change gate means 120 is made up of a capacitor 132 and a resistor 133 connected in parallel to the wire 121. The capacitor 132 and resistor 133 are so sized that, so long as the capacitor 132 is charged at a rate below a preselected rate which is known to indicate a system failure, the capacitor 132 will be discharged through the resistor 133 to ground and the signal will not be propagated any further. However, should the rate of change of the voltage C rise above this pre-selected level, the capacitor 132 will charge at a rate faster than it can be discharged through the resistor 133 to ground, with the result that the signal will be propagated further. Any signal propagated along the wire 121 beyond the resistor 133 is split into two branches and serves two functions. First, the signal so propagated is transmitted through a wire 135 to the previously mentioned wire 74. As noted before in detail, the wire 74 controls the functioning of the control means 75. Any signal transmitted through the wire 135 to the wire 74 will cause the SCR 80 to assume the conductive state. As explained, this will then open the contact pair 81 and 82 which will prevent further transmission of any rejection signals to the reject control mechanism 32. A second output wire 136 connected to the wire 121 transmits a signal which passes to a system-oscillation warning means 138. In physical makeup, the system-oscillation warning means 138 is identical to the first out-of-tolerance alarm means 60 and the second out-of-tolerance alarm means 104. An SCR 140 is connected such that its cathode is grounded and its anode is connected in series to a warning light 142. The warning light 142 in turn is connected in series in the wire 68. The wire 136 is connected to the gate of the SCR 140. When a signal is passed by the wire 136, the SCR is changed from its normally nonconducting state to a conducting state, thereby allowing current to flow through the wire 68 from the voltage source 71 through the warning light 142 to ground, thereby lighting the warning light 142. This then allows an operator of the machine or a service mechanic to determine that the system was shut down as a result of oscillations in the value of the voltage C. Once again, the gate of the SCR 140 is provided with a parallel gate circuit of a resistor 143 and a capacitor 144.

It may be noted that several diodes have not been numbered or mentioned. These diodes serve the well-known-in-the-art function of one-way valves to prevent feedback from part of the circuit into another and as such do not necessarily form a part of this invention. Their function and purpose are well known and their utilization in proper locations should be obvious to one skilled in the art.

Figure 2:
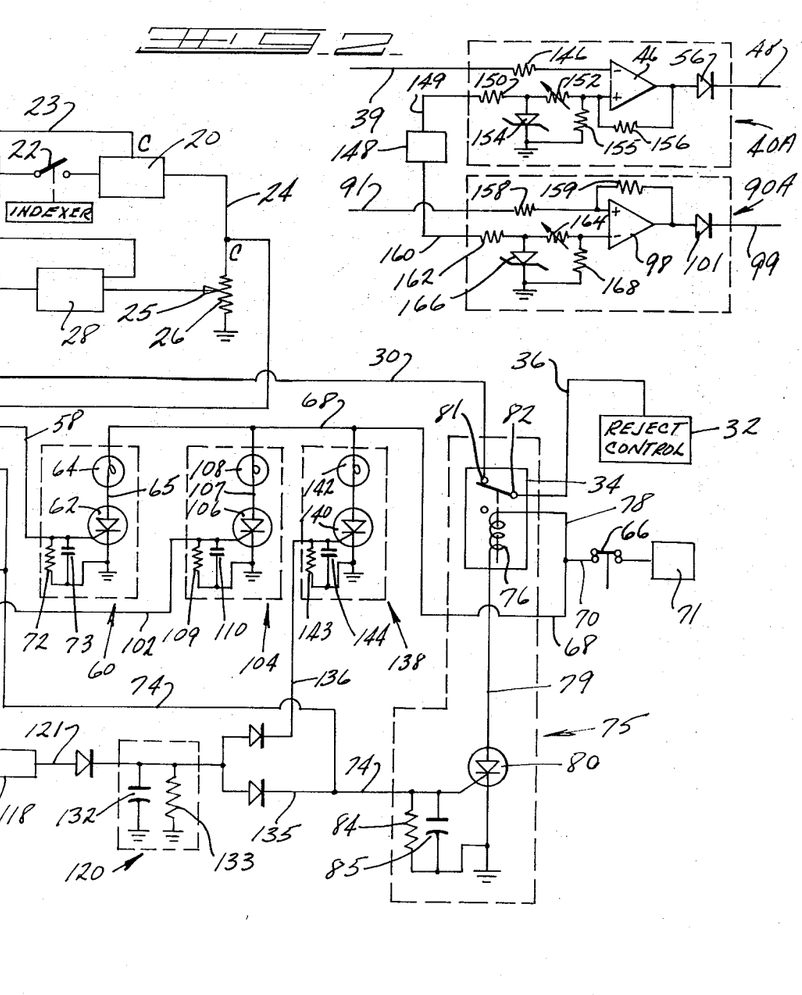
FIG. 2 is a schematic representation of a second embodiment of a portion of the apparatus shown in FIG. 1.

A modified circuit for the two voltage comparison means 40 and 90 is shown in FIG. 2. Elements which are identical to those already described in FIG. 1 are given the same reference numerals in FIG. 2. A first modified voltage comparison means 40A receives as a first input the voltage C through wire 39. A resistor 146 is connected in series in the wire 39, and directly connected into the negative input terminal of the operational amplifier 46. A voltage source 148 supplies a constant voltage of −15 volts through a wire 149 to a second input resistor 150. The resistor 150 is connected in series with a variable resistor 152 which is connected to the positive input terminal of the operational amplifier 46. A Zener diode 154 has its cathode connected to ground and its anode connected between the resistors 150 and 152. A fixed resistor 155 is connected between the output side of the resistor 152 and the cathode of the Zener diode 154. It is well known that a Zener diode is a form of device which maintains a constant voltage from anode to cathode. This voltage is basically fixed for a given Zener diode, within tolerance limits, as is the value of a fixed resistor. In this case, the voltage comparison means 40A determines whether or not the voltage C is above −8 volts. The voltage divider comprised of resistors 152 and 155 is used to adjust the percentage of the voltage across the Zener diode 154 that is applied to positive input of the operational amplifier 46 to exactly −8 volts. This is a fixed input to the positive input terminal of the operational amplifier 46. So long as the voltage C is below −8 volts, the input to the negative input terminal of the operational amplifier 46 will not control, since the −8 volt input to the positive input terminal is greater, and the output of the operational amplifier 46 will be −15 volts. In this case, as before, the diode 56 will block propagation of the signal along the output wire 48. If the voltage C rises above −8 volts, then the input to the negative terminal of the operational amplifier 46 will control, and the output will become +15 volts with the results previously explained. Note that a positive feedback resistor 156 is connected between the positive input terminal of the operational amplifier 46 and the output of the operational amplifier 46. The resistor 156 is used to reduce the hysteresis inherent in this type of circuit and to prevent chatter as the switching voltage is reached, thus defining a sharp trigger or switch point.

A second modified voltage comparison means 90A is used to determine when the voltage C falls below −6 volts. The voltage C is furnished through the wire 91 to a fixed resistor 158, in series, which in turn is connected to the positive input terminal of the operational amplifier 98. As was the case with the voltage comparison means 40A, a hysteresis reduction resistor 159 is connected as a positive feedback between the positive input terminal and the output terminal of the operational amplifier 98. A wire 160 connects the voltage source 148 to a fixed resistor 162 and a variable resistor 164 in series to the negative input terminal of the operational amplifier 98. A Zener diode 166 has its cathode connected to ground and its anode connected between the resistors 162 and 164. A fixed resistor 168 is connected between the cathode of the Zener diode 166 and the output of the resistor 164. In this case, the resistors 164 and 168 are used to adjust the voltage presented to the negative input of the operational amplifier 98 to exactly −6 volts. With the circuit so configured, the input to the positive terminal of the operational amplifier 98 of the negative-in-sign voltage C will keep the output of the operational amplifier 98 at −15 volts so long as the voltage C is greater than −6 volts. As before, the diode 101 will prevent this signal from being transmitted along the output wire 99. When the voltage C goes below −6 volts, then the fixed −6 volt Zener voltage will control. Since this is a negative-in-sign voltage applied to the negative terminal of the operational amplifier 98, the output of the operational amplifier 98 will switch to +15 volts with the results explained earlier with respect to FIG. 1.

What we claim is:

1. In an apparatus for measuring the thickness of an article formed from a dielectric material wherein an antenna is used to establish a radio frequency field outwardly in the direction of an article positioned adjacent thereto; a probe is positioned in said field adjacent to said article; the voltage induced in said probe is an index of the thickness of that portion of said article immediately in front of said probe; a compensated reference voltage is generated during periods when no article is present and held as a constant voltage during periods when an article is present; said induced voltage and said compensated reference voltage are compared to provide a reject signal when the thickness of said article is below a pre-selected value; and said reject signal is transmitted to a reject control mechanism for rejecting articles exhibiting a signal level below a pre-selected level, the improvement in said apparatus which comprises, in combination:

a. a first voltage source for supplying a constant voltage;
   b. a first voltage comparison means connected to said first voltage source and said compensated reference voltage for generating an output signal when said compensated reference voltage rises above a maximum pre-selected level;
   c. a first out-of-tolerance alarm means connected to the output of said first voltage comparison means for signaling the rise of said compensated reference voltage above said maximum pre-selected level in response to said output signal from said first voltage comparison means;
   d. a second voltage comparison means connected to said first voltage source and said compensated reference voltage for generating an output signal when said compensated reference voltage falls below a minimum pre-selected level; and
   e. a second out-of-tolerance alarm means connected to the output of said second voltage comparison means for signaling the fall of said compensated reference voltage below said minimum pre-selected level in response to said output signal from said second voltage comparison means.

2. The improvement of claim 1, further including control means interposed said reject signal and said reject control mechanism, and connected to the output of said first and said second voltage comparison means, for blocking the passage of said reject signal to said reject control mechanism in response to an output signal from either said first voltage comparison means or said second voltage comparison means.

3. The improvement of claim 1, wherein said first voltage comparison means comprises, in combination:

a. an operational amplifier having at least two input terminals and one output terminal, said operational amplifier being so biased as to give either a first discrete output voltage or a second discrete output voltage as a function of the input to said operational amplifier;
   b. a first input resistor connected to said compensated reference voltage;
   c. a second input resistor connected to said first constant voltage supply and connected in parallel with said first input resistor, the common output of said first and second input resistors being connected to one input of said operational amplifier, the relative values of said first and second input resistors being such that a voltage divider is formed which will cause said operational amplifier to present said first discrete output voltage when said compensated reference voltage is below said pre-selected maximum value and to present said second discrete output voltage when said compensated reference voltage is above said pre-selected maximum value; and d. means for blocking the transmission of said first discrete output voltage to said first out-of-tolerance alarm means.

4. The improvement of claim 1, further including a second constant voltage supply, and wherein said first out-of-tolerance alarm means comprises, in combination:

a. an SCR having its cathode connected to ground and its gate connected to the output of said first voltage comparison means;

b. a warning light connected in series with the anode of said SCR and said second voltage supply, whereby said light will be off so long as no signal is supplied to the gate of said SCR; and c. a gate circuit for said SCR comprising a resistor and a capacitor connected in parallel with each other, and connected to the gate of said SCR and to ground.

5. The improvement of claim 1, wherein said second voltage comparison means comprises, in combination:

a. an operational amplifier having at least two input terminals and one output terminal, said operational amplifier being so biased as to give either a first discrete output voltage or a second discrete output voltage as a function of the input to said operational amplifier;

b. a first input resistor connected to said compensated reference voltage;

c. a second input resistor connected to said first constant voltage supply and connected in parallel with said first input resistor, the common output of said first and second input resistors being connected to one input of said operational amplifier, the relative values of said first and second input resistors being such that a voltage divider is formed which will cause said operational amplifier to present said first discrete output voltage when said compensated reference voltage is above said pre-selected minimum value and to present said second discrete output voltage when said compensated reject reference voltage is below said pre-selected minimum value; and d. means for blocking the transmission of said first discrete output voltage to said second out-of-tolerance alarm means.

6. The improvement of claim 1, further including a second constant voltage supply, and wherein said second out-of-tolerance alarm means comprises, in combination:

a. an SCR having its cathode connected to ground and its gate connected to the output of said second voltage comparison means;

b. a warning light connected in series with the anode of said SCR and said second voltage supply, whereby said light will be off so long as no signal is supplied to the gate of said SCR; and c. a gate circuit for said SCR comprising a resistor and a capacitor connected in parallel with each other, and connected to the gate of said SCR and to ground.

7. The improvement of claim 1, wherein said first voltage comparison means comprises, in combination:

a. an operational amplifier having at least two input terminals and one output terminal, said operational amplifier being so biased as to give either a first discrete output voltage or a second discrete output voltage as a function of the input to said operational amplifier;

b. a first input resistor connected to said compensated reference voltage and to one input of said operational amplifier;

c. a second input resistor connected to said first constant voltage supply;

d. a variable resistor connected in series to said second input resistor and to a second input of said operational amplifier;

e. a Zener diode having its cathode connected to ground and its anode connected between said second input resistor and said variable resistor, the value of said Zener diode being substantially equal to a pre-selected maximum allowed value of said compensated reference voltage;

f. a third fixed resistor connected between the cathode of said Zener diode and the output of said variable resistor, said variable resistor serving to adjust the voltage present on said third fixed resistor to a value exactly equal to said pre-selected maximum allowed value of said compensated reference voltage, whereby said operational amplifier will present said first discrete output voltage when said compensated reference voltage is below said pre-selected maximum value and said second discrete output voltage when said compensated reference voltage is above said pre-selected maximum value; and g. means for blocking the transmission of said first discrete output voltage to said first out-of-tolerance alarm means.

8. The improvement of claim 1, wherein said second voltage comparison means comprises, in combination:

a. an operational amplifier having at least two input terminals and one output terminal, said operational amplifier being so biased as to give either a first discrete output voltage or a second discrete output voltage as a function of the input to said operational amplifier;

b. a first input resistor connected to said compensated reference voltage and to one input of said operational amplifier;

c. a second input resistor connected to said first constant voltage supply;

d. a variable resistor connected in series to said second input resistor and to a second input of said operational amplifier;

e. a Zener diode having its cathode connected to ground and its anode connected between said second input resistor and said variable resistor, the value of said Zener diode being substantially equal to a preselected minimum allowed value of said compensated reject reference voltage;

f. a third fixed resistor connected between the cathode of said Zener diode and the output of said variable resistor, said variable resistor serving to adjust the voltage present on said third fixed resistor to a value exactly equal to said pre-selected minimum allowed value of said compensated reference voltage, whereby said operational amplifier will present said first discrete output voltage when said compensated reference voltage is above said pre-selected minimum value and said second discrete output voltage when said compensated reference voltage is below said pre-selected minimum value; and g. means for blocking the transmission of said first discrete output voltage to said second out-of-tolerance alarm means.

9. The apparatus of claim 2, further including a second voltage supply, and wherein said control means comprises, in combination:

a. a normally closed relay having at least one contact pair, said reject signal passing through said contact pair to said reject control mechanism;

b. an SCR having its cathode connected to ground and its gate connected to the output of both said first and second voltage comparison means;

c. an operating coil within said relay connected in series with the anode of said SCR and said second voltage supply for effecting the opening of said contact pair when said operating coil ie energized, whereby said reject signal will be passed to said reject control mechanism so long as no signal is supplied to the gate of said SCR, and said reject control mechanism will be disabled by the opening of said contact pair whenever a signal is furnished to the gate of said SCR by either said first voltage comparison means or said second voltage comparison means; and d. a gate circuit for said SCR comprising a resistor and a capacitor connected in parallel with each other and connected to the gate of said SCR and to ground.

10. In an apparatus for measuring the thickness of an article formed from a dielectric material wherein an antenna is used to establish a radio frequency field outwardly in the direction of an article positioned adjacent thereto; a probe is positioned in said field adjacent to said article; the voltage induced in said probe is an index of the thickness of that portion of said article immediately in front of said probe; a compensated reference voltage is generated during periods when no article is present and held as a constant voltage during periods when an article is present; said induced voltage and said compensated reference voltage are compared to provide a reject signal when the thickness of said article is below a pre-selected value; and said reject signal is transmitted to a reject control mechanism for rejecting articles exhibiting a signal level below a pre-selected level, the improvement in said apparatus which comprises, in combination:

a. circuit means, having an input connected to said compensated reference voltage, for generating, as an output signal, the first derivative with respect to time of said compensated reference voltage;

b. a full wave rectifier having its input connected to the output of said circuit means;

c. a rate-of-change gate means, having its input connected to the output of said full wave rectifier, for generating a signal when the rate of change of said compensated reference voltage rises above a pre-selected value; and d. a system oscillation warning means, connected to the output of said rate-of-change gate means, for signaling the rise of the rate of change of said compensated reference voltage above said pre-selected value.

11. The improvement of claim 10, wherein said circuit means comprises, in combination:

a. an operational amplifier having an output connected to the input of said full wave rectifier;

b. a resistor and a capacitor connected in series with one another and with said compensated reference voltage and to an input of said operational amplifier;

c. a fixed feedback resistor connected between said input of said operational amplifier and said output of said operational amplifier; and d. a variable feedback resistor connected in series with said fixed feedback resistor for adjusting the maximum allowable rate of change of said compensated reference voltage.

12. The improvement of claim 10, wherein said rate-of-change gear means comprises, in combination:

a. a resistor connected to ground and in parallel with the output of said full wave rectifier; and b. a capacitor connected in parallel with said resistor and connected to ground, the relative values of said resistor and said capacitor being such that so long as the rate of change of said compensated reference voltage is below said pre-selected value, said resistor will discharge said capacitor before a signal can be propagated to said system oscillation warning means.

13. The improvement of claim 10, further including a voltage supply, and wherein said system oscillation warning means comprises, in combination:

a. an SCR having its cathode connected to ground and its gate connected to the output of said rate-of-change gate means;

b. a warning light connected in series with the anode of said SCR and said voltage supply, whereby said light will be off so long as no signal is supplied to the gate of said SCR; and c. a gate circuit for said SCR comprising a resistor and a capacitor connected in parallel with each other and connected to the gate of said SCR and to ground.

14. The improvement of claim 10, further including control means, interposed said reject signal and said reject control mechanism, and connected to the output of said rate-of-change gate means, for blocking the passage of said reject signal to said reject control mechanism in response to an output signal from said rate-of-change gate means.

15. The apparatus of claim 14, further including a voltage supply, and wherein said control means comprises, in combination:

a. a normally closed relay having at least one contact pair, said reject signal passing through said contact pair to said reject control mechanism; 'b. an SCR having its cathode connected to ground and its gate connected to the output of said rate-of-change gate means;

c. an operating coil within said relay connected in series with the anode of said SCR and said voltage supply for effecting the opening of said contact pair when said operating coil is energized, whereby said reject signal will be passed to said reject control mechanism so long as no signal is supplied to the gate of said SCR, and said reject control mechanism will be disabled by the opening of said contact pair whenever a signal is furnished to the gate of said SCR by said rate-of-change gate means; and d. a gate circuit for said SCR comprising a resistor and a capacitor connected in parallel with each other and connected to the gate of said SCR and to ground.

16. In an apparatus for measuring the thickness of an article formed from a dielectric material, wherein an antenna ia used to establish a radio frequency field outwardly in the direction of an article positioned adjacent thereto; a probe is positioned in said field adjacent to said article; the voltage induced in said probe is an index of the thickness of that portion of said article immediately in front of said probe; a compensated reference voltage is generated during periods when no article is present and held as a constant voltage during periods when an article is present; said induced voltage and said compensated reference voltage are compared to provide a reject signal when the thickness of said article is below a pre-selected value; and said reject signal is transmitted to a reject control mechanism for rejecting articles exhibiting a signal level below a pre-selected level, the improvement in said apparatus which comprises, in combination:
  a. a first voltage source for supplying a constant voltage;
  b. a first voltage comparison means connected to said first voltage source and said compensated reference voltage for generating an output signal when said compensated reference voltage rises above a maximum pre-selected level;
  c. a first out-of-tolerance alarm means connected to the output of said first voltage comparison means for signaling the rise of said compensated reference voltage above said maximum pre-selected level in response to said output signal from said first voltage comparison means;
  d. a second voltage comparison means connected to said first voltage source and said compensated reference voltage for generating an output signal when said compensated reference voltage falls below a minimum pre-selected level;
  e. a second out-of-tolerance alarm means connected to the output of said second voltage comparison means for signaling the fall of said compensated reference voltage below said minimum pre-selected level in response to said output signal from said second voltage comparison means;
  f. circuit means, having an input connected to said compensated reference voltage, for generating, as an output signal, the first derivative with respect to time of said compensated reference voltage;
  g. a full wave rectifier having its input connected to the output of said circuit means;
  h. a rate-of-change gate means, having its input connected to the output of said full wave rectifier, for generating a signal when the rate of change of said compensated reference voltage rises above a pre-selected value; and
  i. a system oscillation warning means, connected to the output of said rate-of-change gate means, for signaling the rise of the rate of change of said compensated reference voltage above said pre-selected value.

17. The improvement of claim 16, further including control means, interposed said thickness signal and said reject control mechanism, and connected to the output of said first and said second voltage comparison means and to the output of said rate-of-change gate means, for blocking the passage of said reject signal to said reject control mechanism in response to an output signal from any one of said first voltage comparison means, said second voltage comparison means, or said rate-of-change gate means.

18. The improvement of claim 16, wherein said first voltage comparison means comprises, in combination:
  a. an operational amplifier having at least two input terminals and one output terminal, said operational amplifier being so biased as to give either a first discrete output voltage or a second discrete output voltage as a function of the input to said operational amplifier;
  b. a first input resistor connected to said compensated reference voltage;
  c. a second input resistor connected to said first constant voltage supply in parallel with said first input resistor, the common output of said first and second input resistors being connected to one input of said operational amplifier, the relative values of said first and second input resistors being such that a voltage divider is formed which will cause said operational amplifier to present said first discrete output voltage when said compensated reference voltage is below said pre-selected maximum value and to present said second discrete output voltage when said compensated reference voltage is above said pre-selected maximum value; and
  e. means for blocking the transmission of said first discrete output voltage to said first out-of-tolerance alarm means.

19. The improvement of claim 16, further including a second constant voltage supply, and wherein said first out-of-tolerance alarm means comprises, in combination:
  a. an SCR having its cathode connected to ground and its gate connected to the output of said first voltage comparison means;
  b. a warning light connected in series with the anode of said SCR and said second voltage supply, whereby said light will be off so long as no signal is supplied to the gate of said SCR; and
  c. a gate circuit for said SCR comprising a resistor and a capacitor connected in parallel with each other and connected to the gate of said SCR and to ground.

20. The improvement of claim 16, wherein said second voltage comparison means comprises, in combination:
  a. an operational amplifier having at least two input terminals and one output terminal, said operational amplifier being so biased as to give either a first discrete output voltage or a second discrete output voltage as a function of the input to said operational amplifier;
  b. a first input resistor connected to said compensated reference voltage;
  c. a second input resistor connected to said first constant voltage supply in parallel with said first input resistor, the common output of said first and second input resistors being connected to one input of said operational amplifier, the relative values of said first and second input resistors being such that a voltage divider is formed which will cause said operational amplifier to present said first discrete output voltage when said compensated reference voltage is above said pre-selected minimum value and to present said second discrete output voltage when said compensated reference voltage is below said pre-selected minimum value; and d. means for blocking the transmission of said first discrete output voltage to said second out-of-tolerance alarm means.

21. The improvement of claim 1, further including a second constant voltage supply, and wherein said second out-of-tolerance alarm means comprises, in combination:

a. an SCR having its cathode connected to ground and its gate connected to the output of said second voltage comparison means;

b. a warning light connected in series with the anode of said SCR and said second voltage supply, whereby said light will be off so long as no signal is supplied to the gate of said SCR; and c. a gate circuit for said SCR comprising a resistor and a capacitor connected in parallel with each other, and connected to the gate of said SCR and to ground.

22. The improvement of claim 16, wherein said first voltage comparison means comprises, in combination:

a. an operational amplifier having at least two input terminals and one output terminal, said operational amplifier being so biased as to give either a first discrete output voltage or a second discrete output voltage as a function of the input to said operational amplifier;

b. a first input resistor connected to said compensated reference voltage and to one input of said operational amplifier;

c. a second input resistor connected to said first constant voltage supply;

d. a variable resistor connected in series to said second input resistor and to a second input of said operational amplifier;

e. a Zener diode having its cathode connected to ground and its anode connected between said second input resistor and said variable resistor, the value of said Zener diode being substantially equal to pre-selected maximum allowed value of said compensated reject voltage;

f. a third fixed resistor connected between the cathode of said Zener diode and the output of said variable resistor, said variable resistor serving to adjust the voltage present on said third fixed resistor to a value exactly equal to said pre-selected maximum allowed value of said compensated reference voltage, whereby said operational amplifier will present said first discrete output voltage when said compensated reference voltage is below said pre-selected maximum value and said second discrete output voltage when said compensated reference voltage is above said pre-selected maximum value; and g. means for blocking the transmission of said first discrete output voltage to said first out-of-tolerance alarm means.

23. The improvement of claim 16, wherein said second voltage comparison means comprises, in combination:

a. an operational amplifier having at least two input terminals and one output terminal, said operational amplifier being so biased as to give either a first discrete output voltage or a second discrete output voltage as a function of the input to said operational amplifier;

b. a first input resistor connected to said compensated reference voltage and to one input of said operational amplifier;

c. a second input resistor connected to said first constant voltage supply;

d. a variable resistor connected in series to said second input resistor and to a second input of said operational amplifier;

e. a Zener diode having its cathode connected to ground and its anode connected between said second input resistor and said variable resistor, the value of said Zener diode being substantially equal to a pre-selected minimum allowed value of said compensated reject reference voltage;

f. a third fixed resistor connected between the cathode of said Zener diode and the output of said variable resistor, said variable resistor serving to adjust the voltage present on said third fixed resistor to a value exactly equal to said pre-selected minimum allowed value of said compensated reference voltage, whereby said operational amplifier will present said first discrete output voltage when said compensated reference voltage is above said pre-selected minimum value and said second discrete output voltage when said compensated reference voltage is below said pre-selected minimum value; and g. means for blocking the transmission of said first discrete output voltage to said second out-of-tolerance alarm means.

24. The improvement of claim 16, wherein said circuit means comprises, in combination:

a. an operational amplifier having an output connected to the input of said full wave rectifier;

b. a resistor and a capacitor connected in series with one another and with said compensated reference voltage and to an input of said operational amplifier;

c. a fixed feedback resistor connected between said input of said operational amplifier and said output of said operational amplifier; and d. a variable feedback resistor connected in series with said fixed feedback resistor for adjusting the maximum allowable rate of change of said compensated reference voltage.

25. The improvement of claim 16, wherein said rate-of-change gate means comprises, in combination:

a. a resistor connected to ground and in parallel with the output of said full wave rectifier; and b. a capacitor connected in parallel with said resistor and connected to ground, the relative values of said resistor and said capacitor being such that so long as the rate of change of said compensated reference voltage is below said pre-selected value, said resistor will discharge said capacitor before a signal can be propagated to said system oscillation warning means.

26. The improvement of claim 16, further including a second voltage supply, and wherein said system oscillation warning means comprises, in combination:

a. an SCR having its cathode connected to ground and its gate connected to the output of said rate-of-change gate means;

b. a warning light connected in series with the anode of said SCR and said second voltage supply, whereby said light will be off so long as no signal is supplied to the gate of said SCR; and c. a gate circuit for said SCR comprising a resistor and a capacitor connected in parallel with each other and connected to the gate of said SCR and to ground.

27. The apparatus of claim 17, further including a second constant voltage supply, and wherein said control means comprises, in combination:
 a. a normally closed relay having at least one contact pair, said reject signal passing through said contact pair to said reject control mechanism;
 b. an SCR having its cathode connected to ground and its gate connected to the output of both said first and second voltage comparison means and to the output of said rate-of-change gate means;
 c. an operating coil within said relay connected in series with the anode of said SCR and said second voltage supply for effecting the opening of said contact pair when said operating coil is energized, whereby said reject signal will be passed to said reject control mechanism so long as no signal is supplied to the gate of said SCR, and said reject control mechanism will be disabled by the opening of said contact pair whenever a signal is furnished to the gate of said SCR by any one of said first voltage comparison means, said second voltage comparison means, or said rate-of-change gate means; and
 d. a gate circuit for said SCR comprising a resistor and a capacitor connected in parallel with each other and connected to the gate of said SCR and to ground.

28. In a method for inspecting dielectric articles wherein a radio-frequency field is provided at an inspection station; an attenuated signal of said field is detected as an index of the thickness of an article placed in said field; a compensated reference signal is generated during periods when no article is present in said inspection station and held as a constant value when articles are present in said inspection station; and said attenuated signal and said compensated reference signal are summed to give an output signal which is a measure of the thickness of said article, the improvement in said method which comprises the steps of:
 a. electronically comparing the value of said compensated reference signal with a fixed signal level;
 b. electronically generating a first out-of-tolerance signal when the value of said compensated reference signal rises above a pre-selected level;
 c. signaling the rise of said compensated reference signal above said pre-selected value in response to said first out-of-tolerance signal;
 d. electronically generating a second out-of-tolerance signal when the value of said compensated reference signal falls below a pre-selected value; and
 e. signaling the fall of said compensated reference signal below said pre-selected value in response to said second out-of-tolerance signal.

29. The method of claim 28, wherein said thickness output signal is compared with a pre-selected minimum thickness level; a reject signal is generated if said thickness output signal is below said minimum level; and said reject signal is transmitted to a reject control mechanism to reject an article whose thickness is below said minimum level, and wherein said improvement further includes the step of:
 f. blocking the transmission of said reject signal to said reject control mechanism in response to either said first out-of-tolerance signal or said second out-of-tolerance signal.

30. In a method for inspecting dielectric articles wherein a radio-frequency field is provided at an inspection station; an attenuated signal of said field is detected as an index of the thickness of an article placed in said field; a compensated reference signal is generated during periods when no article is present in said inspection station, and held as a constant value when articles are present in said inspection station; and said attenuated signal and said compensated reference signal are summed to give an output signal which is a measure of the thickness of said article, the improvement in said method which comprises the steps of:
 a. electronically generating the first derivative with respect to time of said compensated reference voltage, to obtain a signal representing the rate of change of said compensated reference signal;
 b. electronically comprising said rate-of-change signal of said compensated reference signal with a preselected maximum allowed rate of change of said compensated reference signal;
 c. electronically generating an oscillation warning signal when said rate of change of said compensated reference signal exceeds said pre-selected maximum allowed rate; and
 d. signaling the rise of said rate of change of said compensated reference voltage above said preselected maximum allowed rate.

31. The method of claim 30, wherein said thickness output signal is compared with a pre-selected minimum thickness level; a reject signal is generated if said thickness output signal is below said minimum level; and said reject signal is transmitted to a reject control mechanism to reject an article whose thickness is below said minimum level, and wherein said improvement further includes the step of:
 e. blocking the transmission of said reject signal to said reject control mechanism in response to said oscillation warning signal.

32. In a method for inspecting dielectric articles wherein a radio-frequency field is provided at an inspection station; an attenuated signal of said field is detected as an index of the thickness of an article placed in said field; a compensated reference signal is generated during periods when no article is present in said inspection station and held as a constant value when articles are present in said inspection station; and said attenuated signal and said compensated reference signal are summed to give an output signal which is a measure of the thickness of said article, the improvement in said method which comprises the steps of:
 a. electronically comparing the value of said compensated reference signal with a fixed signal level;
 b. electronically generating a first out-of-tolerance signal when the value of said compensated reference signal rises above a pre-selected level;
 c. signaling the rise of said compensated reference signal above said pre-selected value in response to said first out-of-tolerance signal;
 d. electronically generating a second out-of-tolerance signal when the value of said compensated reference signal falls below a pre-selected value;
 e. signaling the fall of said compensated reference signal below said pre-selected value in response to said second out-of-tolerance signal;

f. electronically generating the first derivative with respect to time of said compensated reference voltage to obtain a signal representing the rate of change of said compensated reference signal;

g. electronically comparing said rate-of-change signal of said compensated reference signal with a preselected maximum allowed rate of change of said compensated reference signal;

h. electronically generating an oscillation warning signal when said rate of change of said compensated reference signal exceeds said pre-selected maximum allowed rate; and i. signaling the rise of said rate of change of said compensated reference voltage above said pre-selected maximum allowed rate.

33. The method of claim 32, wherein said thickness output signal is compared with a pre-selected minimum thickness level; a reject signal is generated if said thickness output signal is below said minimum level; and said reject signal is transmitted to a reject control mechanism to reject an article whose thickness is below said minimum level, and wherein said improvement further includes the step of:

j. blocking the transmission of said reject signal to said reject control mechanism in response to any one of said first out-of-tolerance signal, said second out-of-tolerance signal or said oscillation warning signal.

34. In a method for sorting dielectric articles as a function of their thickness, wherein a radio-frequency field is provided at an inspection station; an attenuated signal of said field is detected as an index of the thickness of an article placed in said field; a compensated reference signal is generated, during periods when no article is present in said inspection station, and held as a constant value when articles are present in said inspection station; said attenuated signal and said compensated reference signal are summed to give an output signal which is a measure of the thickness of said article; said thickness output signal is compared with a pre-selected minimum thickness level; a reject signal is generated if said thickness output signal is below said minimum level; and said reject signal is transmitted to a reject control mechanism to reject an article whose thickness is below said minimum level, the improvement in said method which comprises the steps of:

a. electronically comparing the value of said compensated reference signal with a fixed signal level;

b. electronically generating a first out-of-tolerance signal when the value of said compensated reference signal rises above a pre-selected level;

c. electronically generating a second out-of-tolerance signal when the value of said compensated reference signal falls below a pre-selected value; and d. blocking the transmission of said reject signal to said reject control mechanism in repose to either said first out-of-tolerance signal or said second out-of-tolerance signal.

35. In a method for sorting dielectric articles as a function of their thickness, wherein a radio-frequency field is provided at an inspection station; an attenuated signal of said field is detected as an index of the thickness of an article placed in said field; a compensated reference signal is generated, during periods when no article is present in said inspection station, and held as a constant value when articles are present in said inspection station; said attenuated signal and said compensated reference signal are summed to give an output signal which is a measure of the thickness of said article; said thickness output signal is compared with a pre-selected minimum thickness level; a reject signal is generated if said thickness output signal is below said minimum level; and said reject signal is transmitted to a reject control mechanism to reject an article whose thickness is below said minimum level, the improvement in said method which comprises the steps of:

a. electronically generating the first derivative with respect to time of said compensated reference voltage, to obtain a signal representing the rate of change of said compensated reference signal;

b. electronicially comparing said rate-of-change signal of said compensated reference signal with a preselected maximum allowed rate of change of said compensated reference signal;

c. electronically generating an oscillation warning signal when said rate of change of said compensated reference signal exceeds said pre-selected maximum allowed rate; and d. blocking the transmission of said reject signal to said reject control mechanism in respone to said oscillation warning signal.

36. In a method for sorting dielectric articles as a function of their thickness, wherein a radio-frequency field is provided at an inspection station; an attenuated signal of said field is detected as an index of the thickness of an article placed in said field; a compensated reference signal is generated, during periods when no article is present in said inspection station, and held as a constant value when articles are present in said inspection station; said attenuated signal and said compensated reference signal are summed to give an output signal which is a measure of the thickness of said article; said thickness output signal is compared with a pre-selected minimum thickness level; a reject signal is generated if said thickness output signal is below said minimum level; and said reject signal is transmitted to a reject control mechanism to reject an article whose thickness is below said minimum level, the improvement in said method which comprises the steps of:

a. electronically comparing the value of said compensated reference signal with a fixed signal level;

b. electronicially generating a first out-of-tolerance signal when the value of said compensated reference signal rises above a pre-selected level;

c. electronicially generating a second out-of-tolerance signal when the value of said compensated reference signal falls below a pre-selected value;

d. electronically generating the first derivative with respect to time of said compensated reference voltage to obtain a signal representing the rate of change of said compensated reference signal.

e. electronically comparing said rate-of-change signal of said compensated reference signal with a preselected maximum allowed rate of change of said compensated reference signal;

f. electronically generating an oscillation warning signal when said rate of change of said compensated reference signal exceeds said pre-selected maximum allowed rate; and g. blocking the transmission of said reject signal to said reject control mechanism in response to any one of said first out-of-tolerance signal, said second out-of-tolerance signal or said oscillation warning signal.

* * * * *